E. A. HALBLEIB.
ELECTRIC SYSTEM.
APPLICATION FILED MAR. 19, 1913.
1,115,812.
Patented Nov. 3, 1914.
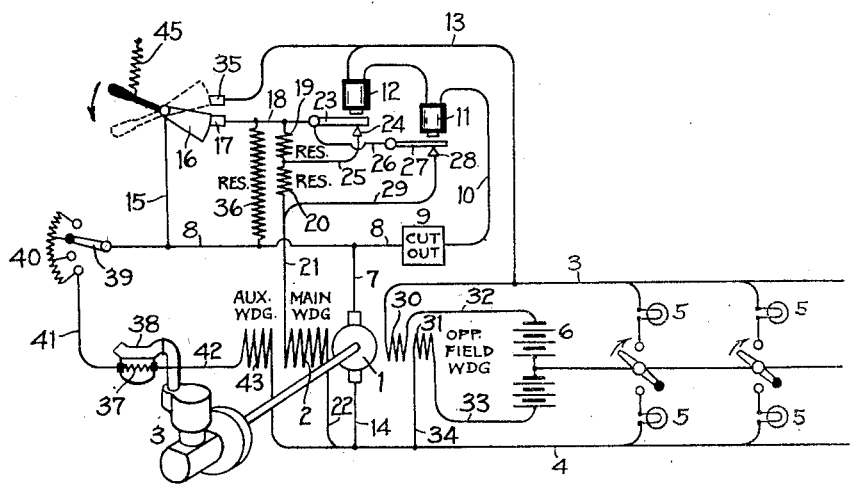
Witnesses:
C. W. Carroll
L. Thon
Inventor:
Edward A. Halbleib
by his attorneys
Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

ELECTRIC SYSTEM.

1,115,812.  Specification of Letters Patent.  Patented Nov. 3, 1914.

Application filed March 19, 1913. Serial No. 755,514.

*To all whom it may concern:*

Be it known that I, EDWARD A. HALBLEIB, a citizen of the United States, and resident of Rochester, in the county of Monroe and State of New York, have invented certain new and useful Improvements in Electric Systems, of which the following is a specification.

This invention relates to electric systems of the type in which an electric generator and a storage-battery are employed in conjunction to supply current for electric lamps, or other translating-devices, and particularly to systems of this type such as are employed in connection with motor-vehicles, wherein the generator is actuated by connection with the engine, or some moving part of the vehicle, and at speeds varying with the speed of the engine or vehicle.

One object of the invention is to so arrange the system as to permit the use of current for energizing a translating-device accessory to the engine of the vehicle while the engine is being started and during its normal operation, while at the same time preventing the draft of current from the storage-battery for this purpose when the engine is at rest. To this end I employ an arrangement in which such translating-device is connected with the generator in such a manner that current may always be drawn directly from the generator through such translating-device, while the storage-battery is connected with the generator and with the translating-device only through means adapted to automatically prevent the return-flow of current from the battery to either the generator or the translating device.

A second object of the invention is to provide for automatically increasing the output of the generator when the translating-device just referred to is thrown into operation, and to this end I employ an auxiliary field-winding in the generator, which is connected in series with the translating-device in question so as to strengthen the field of the generator in proportion to the current employed in said device.

Other objects of the invention, and the features of construction and arrangement by which they are attained, will be set forth in connection with the following description of the illustrated embodiment of the invention.

The accompanying drawing is a diagram, representing the invention as employed in connection with a motor-vehicle provided with an internal-combustion engine.

The drawing illustrates conventionally a direct-current generator having an armature 1 and a main field-winding 2. The armature is connected with, and actuated by, an internal-combustion engine 3. The generator is employed to supply current for various purposes upon the motor-vehicle, and particularly for energizing electric lamps 5, these lamps being fed through main conductors 3 and 4, constituting parts of the load-circuit. In connection with the generator a storage-battery 6 is employed, this battery being connected across the main conductors, or "floated" on the load-circuit, in a well known manner, so that it may either receive current from the generator, or supply current to the load-circuit, according to variations in the electromotive force in the generator.

The generator is connected with the main conductors and the storage-battery through regulating-devices for limiting the output of the generator. From one of the armature-terminals or brushes wires 7 and 8 lead to an automatic return-current cut-out 9. This cut-out is adapted to prevent any substantial return-flow of current through the wires 8 and 7 to the generator, and as such devices are well known I have not illustrated the form and construction of the cut-out. From the cut-out current flows through a wire 10 to the windings 11 and 12 of two relays, and thence, through a wire 13, to the main conductor 3. The other armature-terminal or brush is connected, through a wire 14, with the main-conductor 4. The relays are arranged to control the flow of current through the main field-winding 2. From the wire 8 a wire 15 leads to the movable contact-member 16 of a circuit-controller, and thence, in the normal position of the apparatus, through a fixed contact 17 and a wire 18, to two resistance-coils 19 and 20, which are connected in series. From the resistance-coils the current flows, through a wire 21, to the field-winding 2, and thence, through a wire 22, to the wires 4 and 14, and back to the armature. When the current for the main field-winding flows through the resistance-coils 19 and 20 it is cut down by the action of these coils, but when the generator is operating at a comparatively low speed and a low electromotive force, the resistance-coils are short-circuited by the action of the relays. To this end the wire 18 is extended into connection with the contact-arm 23 of one of the relays, and thence, through a wire 26, to the contact-arm 27 of the other relay. These contact-arms normally engage fixed contacts 24 and 28, respectively, which are connected, by wires 25 and 29, to the wire 21 below the respective resistance-coils. When the generator is running at low speed, therefore, the current from the fixed contact 17 of the circuit-controller may flow through the wires 18 and 26, the contact-arm 27, the fixed contact 28, and the wires 29 and 21 to the main field-winding, the current being thus of full strength and tending to strongly energize the field of the generator. As the flow of current from the generator through the wire 10 and the relay-windings increases, however, the attraction upon the contact-fingers or armatures of the relays increases. The contact-finger 27 is arranged to be attracted first, this being indicated diagrammatically by showing it as lighter than the contact-finger 23. Accordingly, when the current rises to a certain predetermined degree the contact-finger 27 is raised, thus interrupting the short-circuit around the resistance-coil 20, while the short-circuit around the coil 19 continues through the contact-finger 23. Accordingly the resistance of the coil 20 is introduced into the circuit of the main field-winding 2. When the current rises to a further predetermined point the contact-finger 23 is also raised, thus throwing the resistance-coil 19 into the circuit of the main field-winding, and further increasing the resistance of this circuit.

The current from the generator, in addition to feeding the lamps 5, or other translating-devices supplied through the main conductors 3 and 4, also recharges the storage-battery when the generator is producing an excess of current over that required by the translating-devices.

The battery may be connected across the main conductors in any ordinary or suitable manner, but I have illustrated it as connected through an opposition field-winding in the generator, this winding being divided into two equal parts 30 and 31, which are introduced between the battery and the respective main conductors, and connected therewith by wires 32, 33 and 34. This arrangement tends further to regulate the production of current in the generator automatically, and prevent overcharging the battery. It constitutes no part of the present invention, however, the balanced arrangement of the opposition field-winding being disclosed and claimed in another application.

Where an electric system of the type in question is employed in connection with an internal-combustion engine it may be desirable to utilize it as the source of current for energizing certain accessories of the engine, such, for example, as the ignition-devices, or as devices for heating the carbureter or the combustible mixture or fuel of the engine. In such a case, in order that the battery may not be unduly discharged, it is desirable to prevent the draft of current from the storage-battery through such accessory devices, either intentionally or accidentally, when the engine and the generator are at rest. This is particularly the case where the battery and the generator are employed as parts of an automatic starting-system for starting the operation of the engine, wherein it is essential that a sufficient amount of energy for the purpose be always retained in the battery. In the diagram I have illustrated a heating-coil 37 associated with the carbureter or vaporizer 38 of the engine 3, and adapted to heat the fuel within the carbureter to promote its combustion in the engine. This heating-coil is connected with the circuits already described in such a manner that it may draw current from the generator when the generator is in operation, but cannot draw current from the storage-battery when the generator is at rest. To this end the heating-coil is supplied with current from the wire 8 through a movable contact-arm 39 and a variable resistance 40, and through a wire 41. From the heating-coil 37 the current returns through a wire 42, and an auxiliary field-winding 43, to the main conductor 4, and thence, through the wire 14, back to the armature of the generator. When the generator is in operation the circuit just described is energized with an amount of current depending on the adjustment of the variable resistance. When the generator is at rest no current flows through this circuit, for the reason that the reverse-current cut-out 9 prevents the flow of current from the battery through the heating-coil, as well as through the generator.

While the heating-coil cannot be energized when the generator is at rest, it is preferably so arranged that it may be energized at the moment when the engine is actuated for the purpose of starting it. I have illustrated the system as adapted to utilize the generator as an electric motor to start the engine, and for this purpose I employ the circuit-controller, above referred to, as means for closing a shunt-circuit around the cut-out 9, so as to permit current to flow, from the battery, simultaneously to the generator and to the heating-coil 37. To this end the circuit-controller has a second fixed contact 35, which is not normally engaged by the movable contact-member 16 of the circuit-controller. The circuit-controller is manually operable, however, in the direction indicated by the arrow in the drawing, and the first result of its movement is to connect the fixed contact 35, as well as the fixed contact 17, with the wire 15. Current now flows back from the battery, through the wire 32, the opposition field-winding 30, and the wires 3 and 13, to the fixed contact 35, and thence to the movable contact-member 16. At this point the current divides, and a part of it flows through the fixed contact 17, the wire 18, and the contacts of the relays, to the field-winding 2 of the generator. The other part of the current flows, through the wire 15, to the wire 8, and there divides again, a part of the current flowing back, through the wire 7, to the armature of the generator, while the rest of the current flows, through the contact-arm 39, the resistance-coil 40 and the wire 41, to the heating-coil 37, and thence, through the wire 42 and the auxiliary field-winding 43, back to the battery by way of the main conductor 4, the wires 33 and 34, and the opposition field-winding 31. The heating-coil 37 now operates to assist vaporization in the carbureter, while the generator acts as a motor to actuate the engine, and thus cause it to start into operation. By continuing the operative movement of the circuit-controller it is caused to perform a further function, namely, to cut down the flow of current through the main field-winding 2, and thus cause the generator, in accordance with well known principles, after having initiated the rotation of the engine, to increase its speed of operation in consequence of the weakening of its field. To this end a resistance-coil 36 is connected across the wires 8 and 18. The last part of the operative movement of the circuit-controller causes the contact-member 16 to disengage the fixed contact 17, while remaining in engagement with the fixed contact 35. The current flowing back through the wire 13 can now no longer reach the main field-winding directly through the circuit including the fixed contact 17 and the wire 18, but all of the current flows first, through the wire 15, to the wire 8. Here, however, a part of the current flows through the resistance-coil 36 to the wire 18, and then by way of the relays and the wire 21 to the main field-winding. The flow of current through the field-winding is thus reduced by the introduction of the resistance-coil 36 into the circuit. As soon as the normal operation of the engine is started the circuit-controller may be released, and it is then returned to normal position by the action of a spring 45 connected with it. Thereafter, until the circuit-controller is again operated to start the engine, there is no path through which current can flow from the storage-battery to the heating-coil 37. The function of the auxiliary field-winding 43 is, as above described to increase the strength of the field of the generator whenever the heating-coil is thrown into operation by the contact-member 39, in proportion to the amount of current flowing through the heating-coil, thus adapting the system automatically to supply the necessary current without diminishing the amount of current supplied to the storage-battery and the other translating-devices.

It will be apparent that the generator, with its main shunt and series windings, the storage-battery, and the generator or regulating-devices, including the reverse-current cut-out, constitute a self-regulating system adapted to supply automatically, notwithstanding variations in the speed of the generator, a volume of current suited to the requirements of the load-circuit, and for the purpose of suitably charging the battery, but that the heating-coil 37, however, or any other accessory translating-device requiring a considerable flow of current, if connected with the main load-circuit, would constitute a disturbing factor which might at times diminish the available current so as to deplete the storage-battery or prevent it from being recharged when necessary. In the present arrangement, however, wherein the heating-coil is energized by a work-circuit independent of the main work-circuit, the use of the auxiliary or booster-winding connected in series with this translating-device, and proportioned to the flow of current thereto, produces an arrangement in which the out-put of the generator, under all conditions of speed, is automatically increased and diminished substantially in proportion to the expenditure of current in this translating-device, in such a manner that during the normal operation of the system this device may be thrown into or out of action without in any way interfering with or modifying the normal self-regulating operation of the system, and thus a heating-coil or other auxiliary translating-device may be added in this manner to an electric system of the type in question without danger of impairing the efficiency of the system for its primary object of supplying electric lights or starting the engine.

I claim:—

1. In an electric system, the combination, with a storage-battery, an engine, and an electric translating-device accessory to the engine; of an electric generator actuated by the engine; two branch-circuits including the battery and said translating-device, respectively, and connecting them with the generator, whereby the generator may charge the battery and energize the translating-device; and an automatic return-current cut-out interposed in the branch-circuit which includes the storage-battery, whereby the current is normally prevented from returning from the battery to either the generator or the translating-device.

2. In an electric system, the combination, with a storage-battery, an engine and an electric translating-device accessory to the engine; of an electric generator actuated by the engine; two branch-circuits including the battery and said translating-device, respectively, and connecting them with the generator, whereby the generator may charge the battery and energize the translating-device; an automatic return current cut-out interposed in the branch-circuit which includes the storage-battery, whereby the current is normally prevented from returning from the battery to either the generator or the translating-device; and manually operable means for short-circuiting the return-current cut-out to permit current to return from the battery to the translating-device.

3. The combination, with a self-regulating electric system comprising a differentially-wound generator, a work-circuit, a storage-battery floated on the line and connected in series with the differential winding of the generator, and a reverse-current cut-out also in series with the storage-battery, of a translating-device connected with, and energized by, the generator independently of said work-circuit, and an auxiliary booster field-winding on the generator connected in series with said translating-device so as to prevent unbalancing of the system by the operation thereof.

EDWARD A. HALBLEIB.

Witnesses:
W. A. MONTGOMERY,
FARNUM F. DORSEY.